(12) United States Patent
Sakai et al.

(10) Patent No.: US 11,030,811 B2
(45) Date of Patent: Jun. 8, 2021

(54) AUGMENTED REALITY ENABLED LAYOUT SYSTEM AND METHOD

(71) Applicant: Orbit Technology Corp., Newport Beach, CA (US)

(72) Inventors: Satoshi Sakai, Newport Beach, CA (US); Kalev Kask, Newport Beach, CA (US); Anand H. Subbaraman, Irvine, CA (US); Alexey A. Kiskachi, Irvine, CA (US)

(73) Assignee: Orbit Technology Corporation, Newport Beach, CA (US)

( * ) Notice: Subject to any disclaimer, the term of this patent is extended or adjusted under 35 U.S.C. 154(b) by 0 days.

(21) Appl. No.: 16/160,340

(22) Filed: Oct. 15, 2018

(65) Prior Publication Data
US 2020/0118339 A1    Apr. 16, 2020

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01)

(58) Field of Classification Search
None
See application file for complete search history.

(56) References Cited

U.S. PATENT DOCUMENTS

| 8,451,266 | B2 | 5/2013 | Hertenstein |
| 9,058,687 | B2 | 6/2015 | Kruglick |
| 9,129,433 | B1 | 9/2015 | Korobkin |
| 9,245,387 | B2 | 1/2016 | Poulos et al. |
| 9,607,436 | B2 | 3/2017 | Malamud et al. |
| 9,881,584 | B2 | 1/2018 | Dakss et al. |
| 10,325,409 | B2 * | 6/2019 | Costa ................... G06F 3/0304 |
| 10,482,682 | B2 * | 11/2019 | Goossens ............ G06F 3/04815 |
| 2012/0120113 | A1 | 5/2012 | Hueso |
| 2012/0250940 | A1 * | 10/2012 | Kasahara ................ G06F 3/011 382/103 |
| 2015/0040074 | A1 | 2/2015 | Hofmann et al. |
| 2015/0091942 | A1 * | 4/2015 | Ko ........................ G06T 19/006 345/633 |

(Continued)

OTHER PUBLICATIONS

"On User-Defined Region Matching for Augmented Reality", by Jiawei Zhou and Shahram Payandeh, Proceedings of the IEEE 28th Canadian Conference on Electrical and Computer Engineering, pp. 1414-1419, May 3-6, 2015. (Year: 2015).*

(Continued)

*Primary Examiner* — James A Thompson
(74) *Attorney, Agent, or Firm* — Olav M. Underdal; IDP Patent Services

(57) ABSTRACT

A system for augmented reality layout includes an augmented reality layout server and an augmented reality layout device, including a processor; a non-transitory memory; an input/output; a model viewer providing two-dimensional top, three-dimensional, and augmented reality views of a design model; a model editor; a model synchronizer, which aligns and realigns the design model with a video stream of an environment; a model cache; and an object cache. Also disclosed is method for augmented reality layout including creating model outline, identifying alignment vector, creating layout, verifying design model, editing design model, and realigning design model.

15 Claims, 12 Drawing Sheets

(56) References Cited

U.S. PATENT DOCUMENTS

| | | | |
|---|---|---|---|
| 2015/0294507 A1 | 10/2015 | Teegan | |
| 2016/0110913 A1* | 4/2016 | Kosoy | G06T 17/00 382/154 |
| 2016/0125660 A1* | 5/2016 | Grodecki | G06T 17/05 345/419 |
| 2016/0148433 A1* | 5/2016 | Petrovskaya | G02B 27/01 345/633 |
| 2017/0004651 A1 | 1/2017 | Xiong | |
| 2017/0039765 A1* | 2/2017 | Zhou | G06T 7/55 |
| 2017/0216728 A1* | 8/2017 | Logan | A63F 13/213 |
| 2018/0322709 A1* | 11/2018 | Goossens | G06F 3/04815 |
| 2018/0350145 A1* | 12/2018 | Byl | G06F 3/017 |
| 2019/0043197 A1* | 2/2019 | Adler | G06T 17/10 |
| 2020/0074748 A1* | 3/2020 | de Almeida Barreto | G06T 7/344 |

OTHER PUBLICATIONS

"Layout Planning for Academic Exhibits using Augmented Reality", by Andres Cortes-Davalos and Sonia Mendoza, 13th International Conference on Electrical Engineering, Computing Science and Automatic Control (CCE), 2016. (Year: 2016).*

ITunes, Apple, App Store, https://itunes.apple.com/us/app/amazon-shopping-made-easy/id297606951/ AMZN Mobile LLC, Oct. 26, 2017, US.

ITunes, Apple, App Store, https://itunes.apple.com/us/app/ikea-place/id1279244498, Ikea Place, Reviewed, Jun. 6, 2018, US.

ITunes, Apple, App Store, https://itunes.apple.com/us/app/housecraft/id1261483849, HouseCraft, Sirvo LLC, Reviewed Oct. 11, 2017, US.

The Medical Futurist, News Letter, http://medicalfuturist.com/top-9-augmented-reality-companies-healthcare/ Article, Aug. 31, 2017.

Vismats, Blog, https://blog.sketchup.com/article/meet-canvas-tapmeasure-3d-home-scanning-everyone, Sketchup, Blog, May 20, 2017.

ITunes, Apple, App Store, https://itunes.apple.com/us/app/roomscan-pro/id673673795, Locometrics, Reviewed by Huffington Post, Mar. 21, 2014.

ITunes, Apple, App Store, https://itunes.apple.com/us/app/tapmeasure-ar-utility/id1281766938, Occipital Inc., Reviewed, Sep. 20, 2017.

* cited by examiner

Augmented Reality Layout Device

Augmented Reality View for Floor and Boundary Detection

Two-Dimensional Application View

Three-Dimensional Application View

Augmented Reality Application View

Augmented Reality Application View

Augmented Reality Application View

Method for Augmented Reality Layout

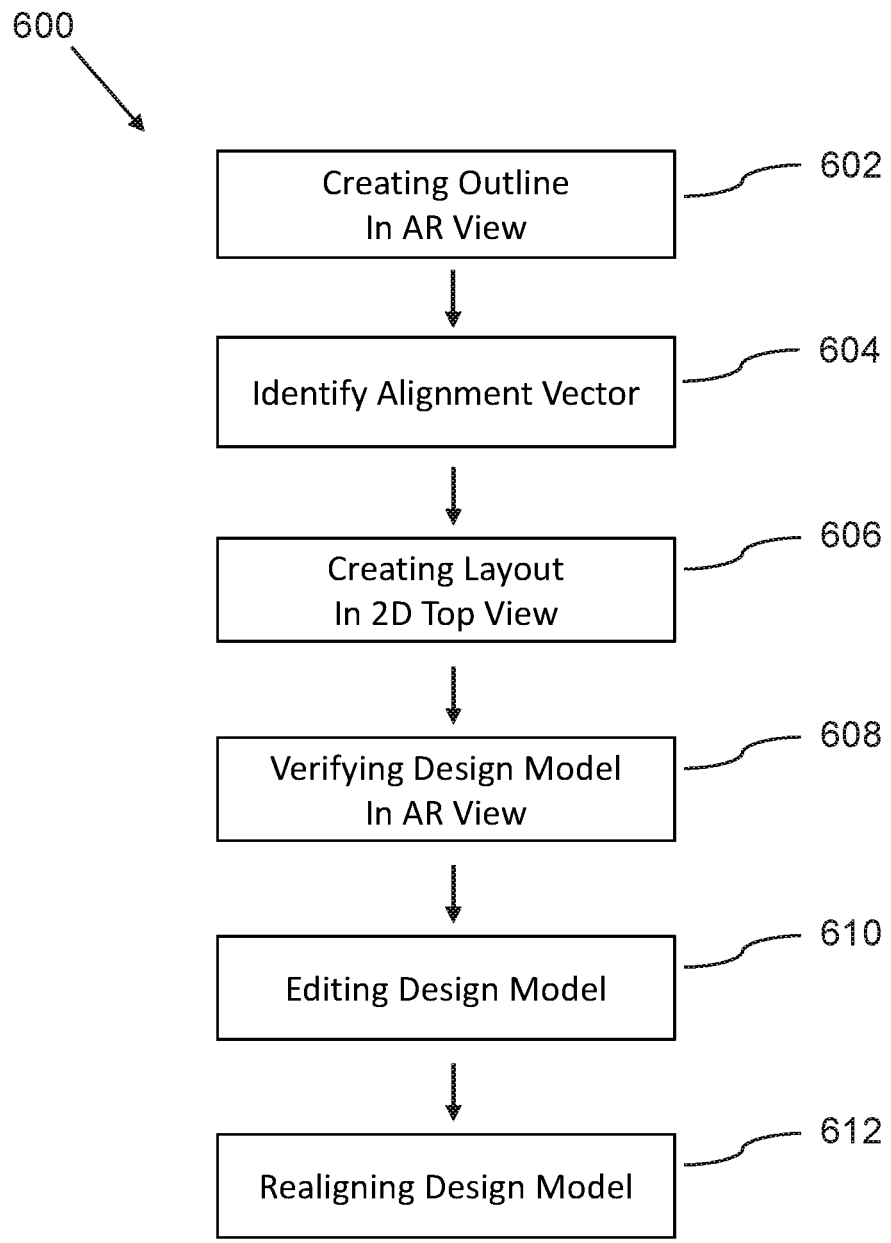

AUGMENTED REALITY ENABLED LAYOUT SYSTEM AND METHOD

CROSS-REFERENCE TO RELATED APPLICATIONS

N/A.

FIELD OF THE INVENTION

The present invention relates generally to the field of layout apps for industrial and interior design, and more particularly to methods and systems for using augmented reality for layout design.

BACKGROUND OF THE INVENTION

Current software application for three-dimensional layout facilitate layout and viewing but generally do not offer precise layout and therefore cannot be used for industrial purposes for which accurate layout of machinery is critical.

As such, considering the foregoing, it may be appreciated that there continues to be a need for novel and improved devices and methods for layout.

SUMMARY OF THE INVENTION

The foregoing needs are met, to a great extent, by the present invention, wherein in aspects of this invention, enhancements are provided to the existing model of layout applications.

In an aspect, a system for augmented reality layout can include:
a) an augmented reality layout server; and
b) an augmented reality layout device, which comprises a camera;
wherein the augmented reality layout device can be configured to create a design model and populate the design model with objects retrieved from the augmented reality layout server;
such that the augmented reality layout device can be configured to allow a user to position the objects precisely in a two-dimensional top view of the design model; and
such that the augmented reality layout device can be configured to show the design model in an augmented reality view, wherein the design model is superimposed on a video stream showing an environment that the design model is designed for, wherein the video stream is received from the camera of the augmented reality layout device.

In a related aspect, the augmented reality layout device can further include:
a) a processor;
b) a non-transitory memory;
c) an input/output component; and
d) a model viewer, which can be configured to render views of the design model, wherein the views can include the two-dimensional top view, a three-dimensional perspective view, and the augmented reality view.

In a further related aspect, the augmented reality layout device can further include:
a model synchronizer, which can align the design model with the video stream, such that the model synchronizer allows the user to capture an initial alignment vector that overlays an initial alignment position in the video stream during initial positioning of objects in the augmented reality view, such that the design model is stored with the initial alignment vector.

In a further related aspect, the model synchronizer can be further configured to realign the design model when the design model is reloaded; such that the model synchronizer allows the user to capture a current alignment vector that overlays a current alignment position in the video stream, such that the model synchronizer executes a linear transformation calculation to calculate a transposition vector and a transformation matrix, such that the model synchronizer executes a linear perspective transposition and rotational transformation from a location and direction of an initial three-dimensional view to a current three-dimensional view of the design model, such that the current three-dimensional view is superimposed on the video stream.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is a flowchart illustrating steps that may be followed, in accordance with one embodiment of a method or process of augmented reality layout.

DETAILED DESCRIPTION

Figure 1:
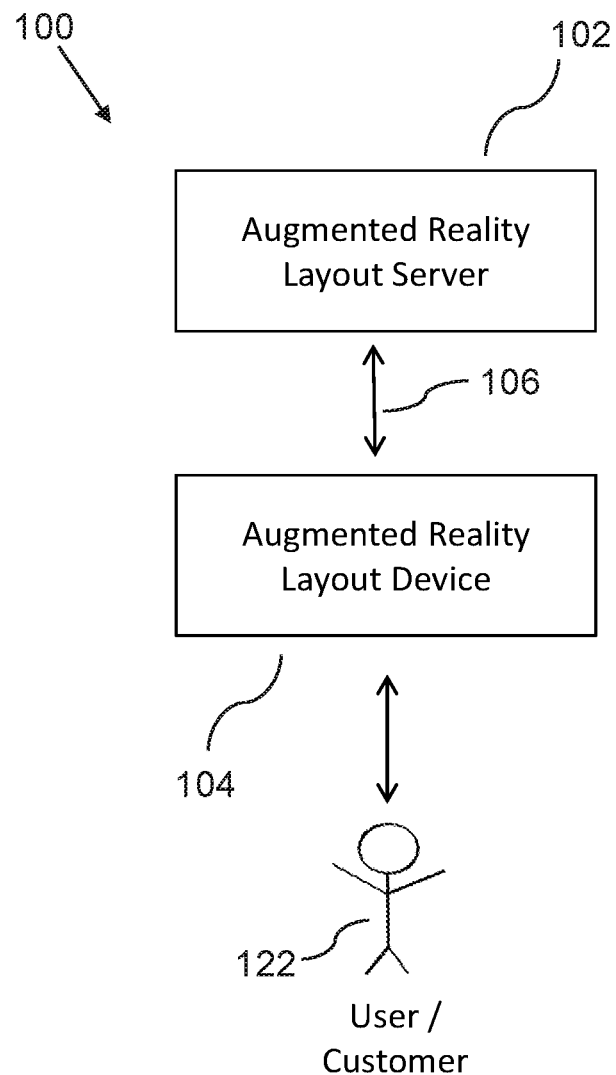
FIG. 1 is a schematic diagram illustrating a system for augmented reality layout, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for augmented reality layout 100 with reference to FIG. 1, in such manner that like reference numerals refer to like components throughout; a convention that we shall employ for the remainder of this specification.

Augmented reality (AR) is the integration of digital information with the user's environment in real time. An augmented reality system creates a composite view for the user that is the combination of the real scene viewed by the user and a virtual scene generated by the computer that augments the scene with additional information.

For example, a retailer would provide an app that lets the user view his/her room with a piece of furniture superimposed/added on(to) the room In the following, we shall employ the following terminology:

a) 3D features: features such as floor, walls, obstacles, door, windows, which define the (3D) boundary of the room;
b) Objects: User-defined objects, which are stored in the object library 214 (or on the augmented reality layout device 104), and can be added/deleted to/from the 3D model and manipulated;
c) Model (room/layout model): A design model (in three dimensions) representing 3D features and objects; supports various interfaces to allow any operation needed. The design model can be serialized such that it is persistent in storage.
d) 3D view: Three-dimensional rendering of the model;
e) 2D view Two-dimensional rendering of the model; as top-view projection onto the floor;
f) AR view: Augmented reality view, a real-time virtual camera view of the room/model with layout superimposed on it
g) Layout: Position, location, orientation of the user-defined objects in the room/model;
h) Online app use: Includes all view, including AR view; camera must be on;
i) Offline use of the app: Includes utilizing views other than AR view; camera is off; and
j) Model synchronization: Synchronizing model/AR view means creating a mapping between model features/object and camera view, such that features/objects can be accurately superimposed on AR view.

In an embodiment a system for augmented reality layout 100 can include:
a) an augmented reality layout server 102; and
b) an augmented reality layout device 104, which is connected to the augmented reality layout server 102 via a network 106;
wherein the augmented reality layout device is configured to create a design model and populate the design model with objects retrieved from the augmented reality layout server;
such that the augmented reality layout device is configured to allow a user to position the objects precisely in a two-dimensional top view of the design model;
such that the augmented reality layout device is configured to show the design model in an augmented reality view, wherein the design model is accurately superimposed on a video stream showing an environment that the design model is designed for, wherein the video stream is received from the camera of the augmented reality layout device.

In a related embodiment, an augmented reality layout server 102 can include:
a) A processor 202;
b) A non-transitory memory 204;
c) An input/output component 206;
d) A model storage 212, which stores and processes a plurality of design models;
e) An object library 214, which stores a plurality of objects, such as chairs, tables, doors, for use in design models; and
f) An API 216 (Application Programming Interface), for allowing external access to the system for augmented reality layout 100; all connected via
g) A data bus 220.

In a related embodiment, an augmented reality layout device 104 can include:
a) A processor 302;
b) A non-transitory memory 304;
c) An input/output component 306;
d) A model viewer 310, which can be configured to render views of a design model, wherein the views include a two-dimensional top view, a three-dimensional perspective view, and an augmented reality view; and
e) A model editor 312, which can be configured to allow a user 122 to create, edit, save, and delete design models;
f) A model synchronizer 314, which can be configured to align a model with a 3D video stream of the environment that the model is designed for;
g) A model cache 316, for local storage of an active design model, which can be retrieved from the model storage 212; and
h) An object cache 318, for local storage of objects retrieved from the object library 214; all connected via
i) A data bus 320.

In a related embodiment, a design model can include:
a) A room layout, which is a definition of room boundaries, including:
   a) 3D features, including Floor, Walls, Obstacles, Doors, Windows, etc., such that each feature is associated with feature attributes, including:
   Location;
   Size/Dimensions;
   Color/texture; and/or
   Other attributes; and
b) An object layout, including a plurality of objects and the position of the objects in the room layout.

In a further related embodiment, the model can be created
a) Online—by extracting 3D features of the room from an AR view 400e of the room; or
b) Offline—by the user sketching 3D features in the 2D view In a related embodiment, a model can be synchronized with the AR view 400e online to produce real-time interactive visualization of the layout.

In a related embodiment, the model can be accessed via an API 216, which allows:
a) creation/manipulation of the model (room/layout); and
b) extraction of data to generate various views (e.g. 3D, 2D, AR).

Figure 4A:
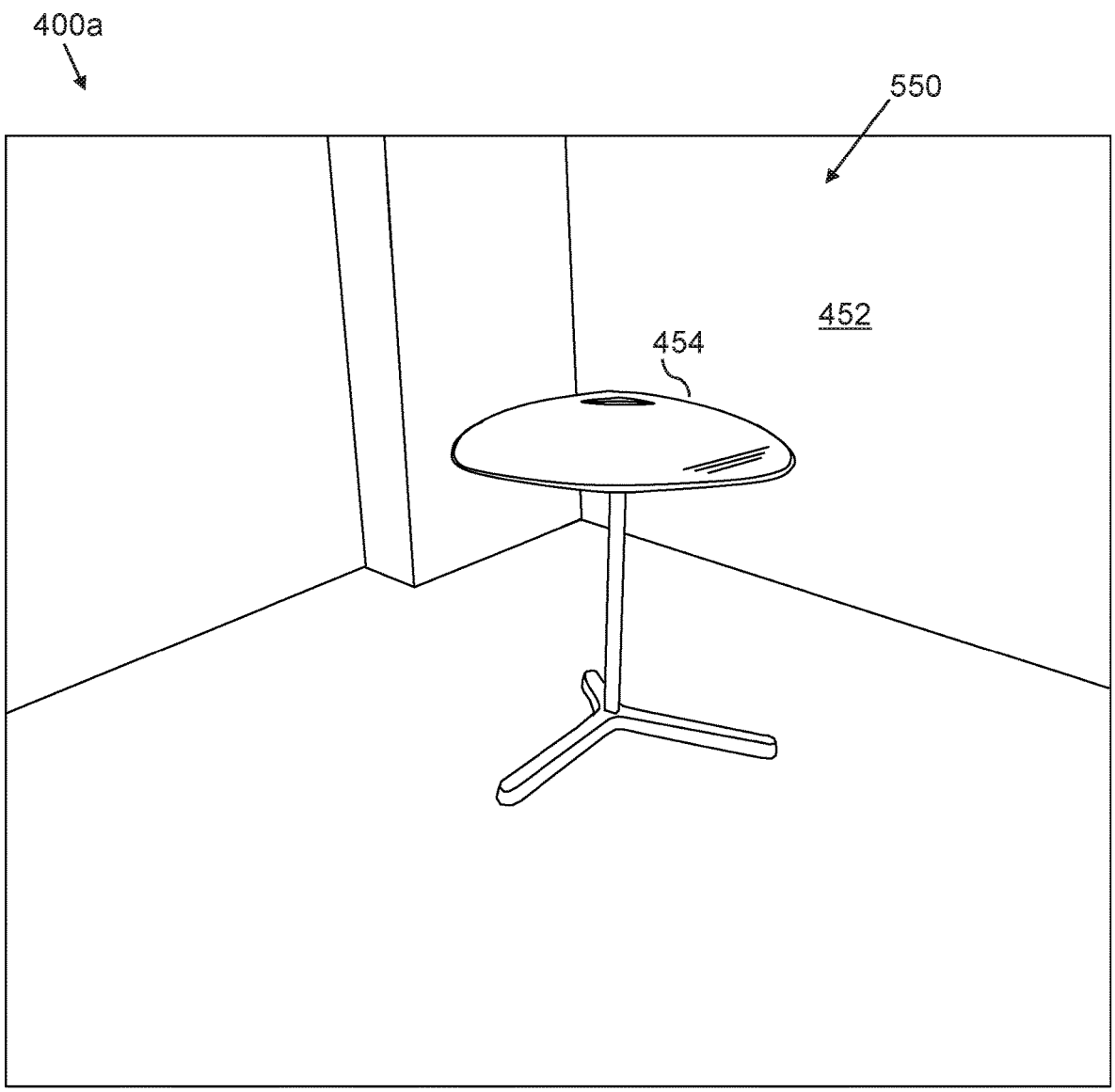
FIG. 4A is an illustration of a graphical user interface for an augmented reality model view, according to an embodiment of the invention.
Figure 4B:
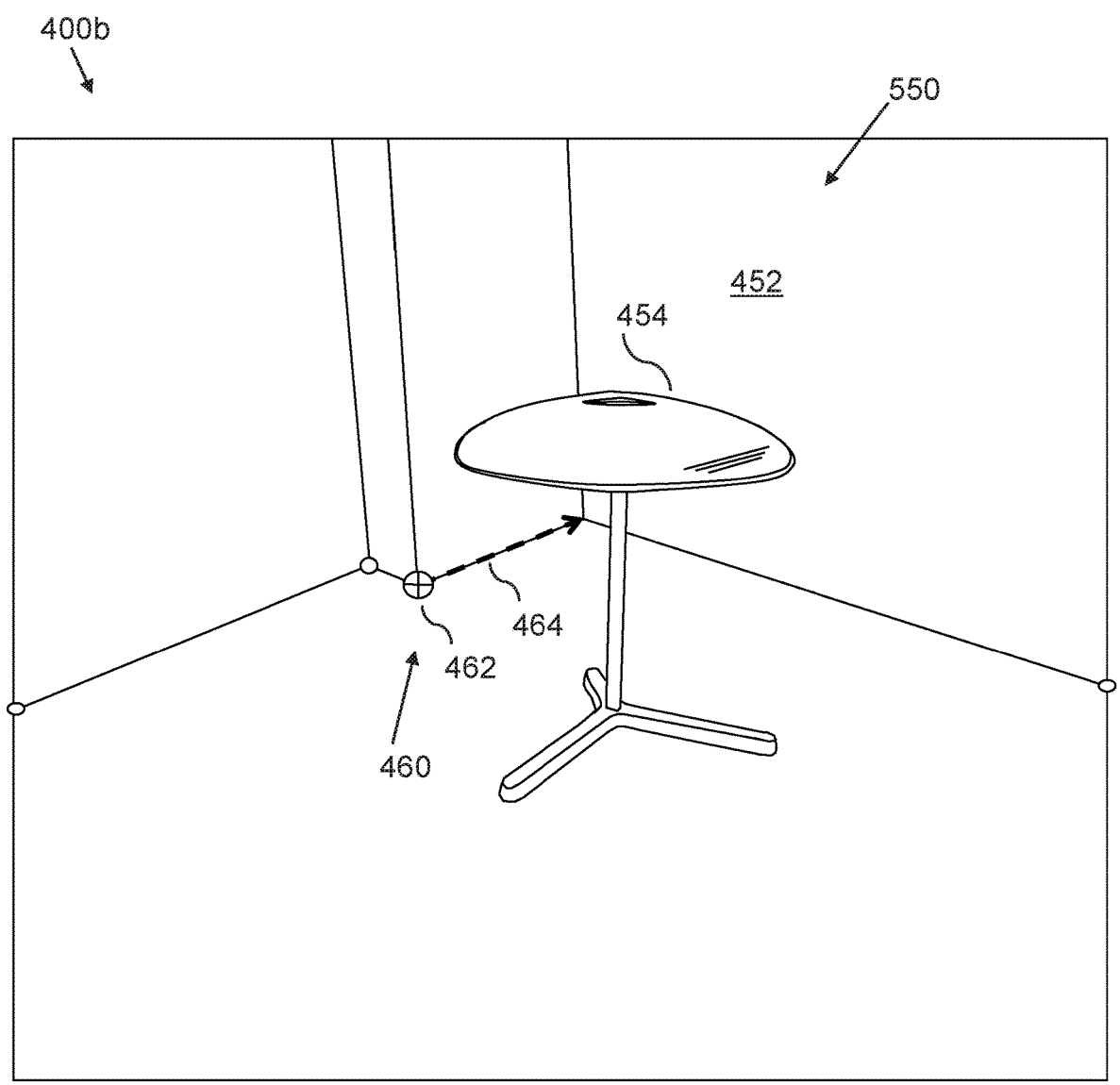
FIG. 4B is an illustration of a graphical user interface for an augmented reality model view, according to an embodiment of the invention.
Figure 4C:
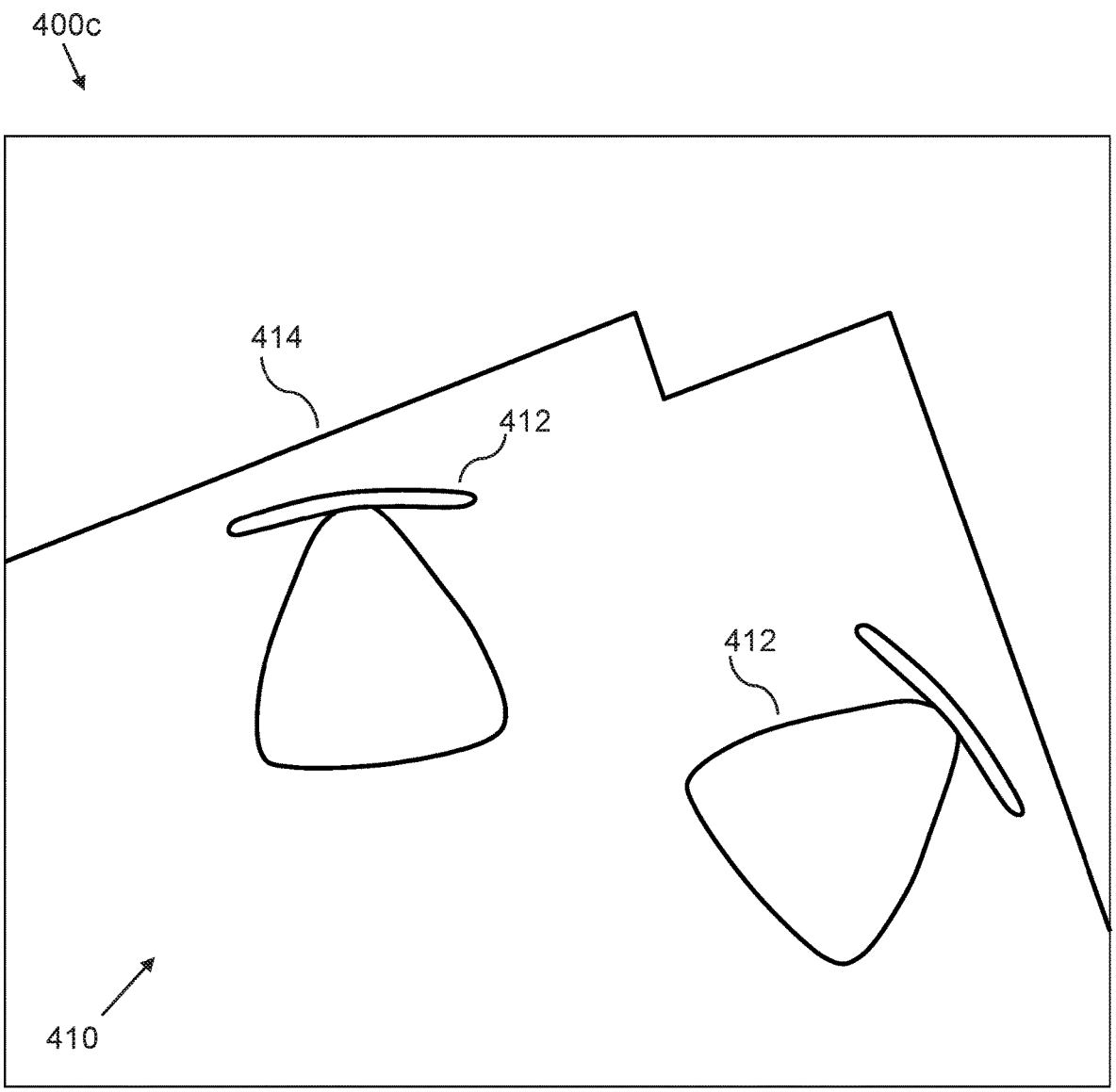
FIG. 4C is an illustration of a graphical user interface for a two-dimensional model view, according to an embodiment of the invention.
Figure 4D:
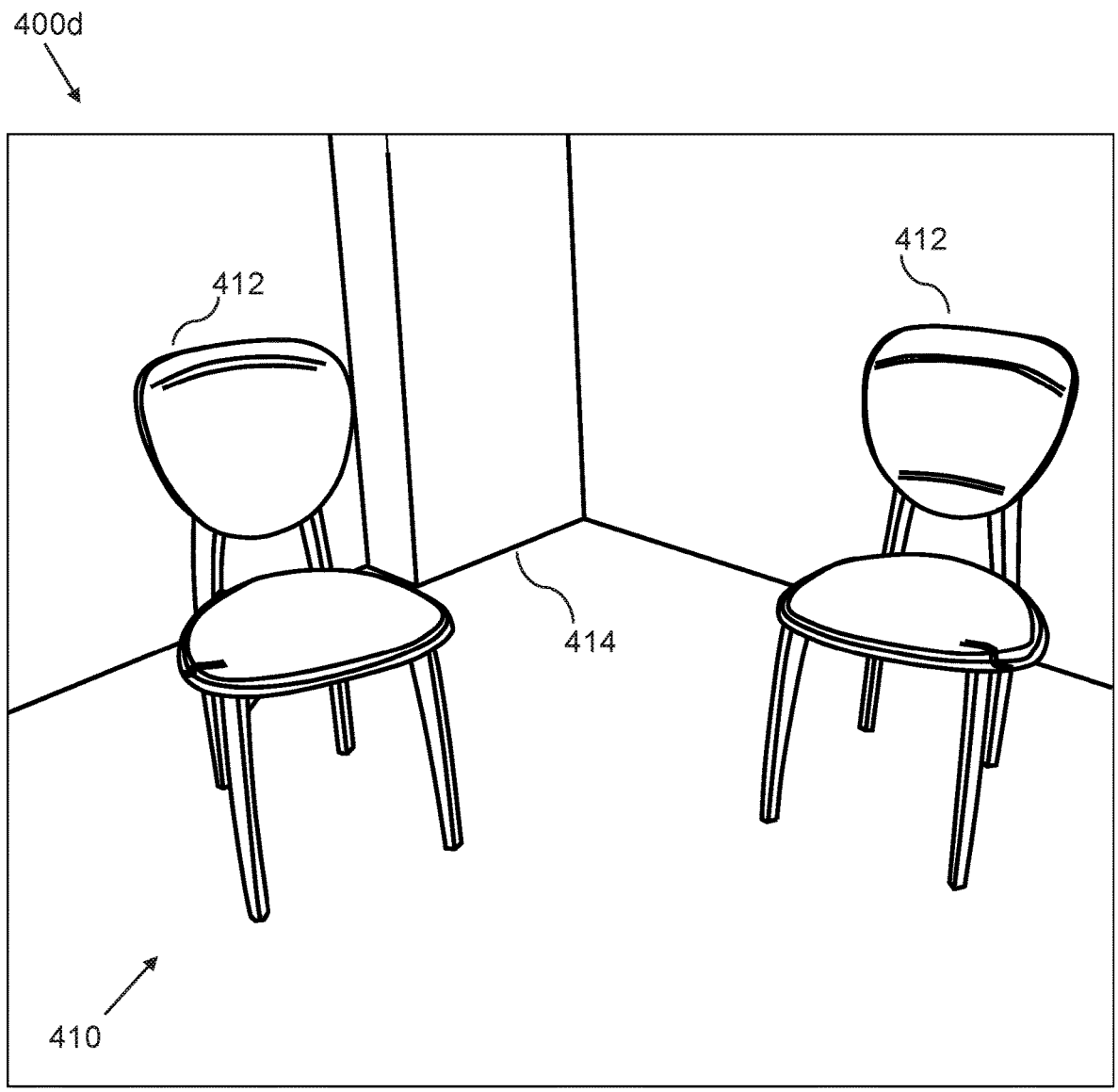
FIG. 4D is an illustration of a graphical user interface for a three-dimensional model view, according to an embodiment of the invention.
Figure 4E:
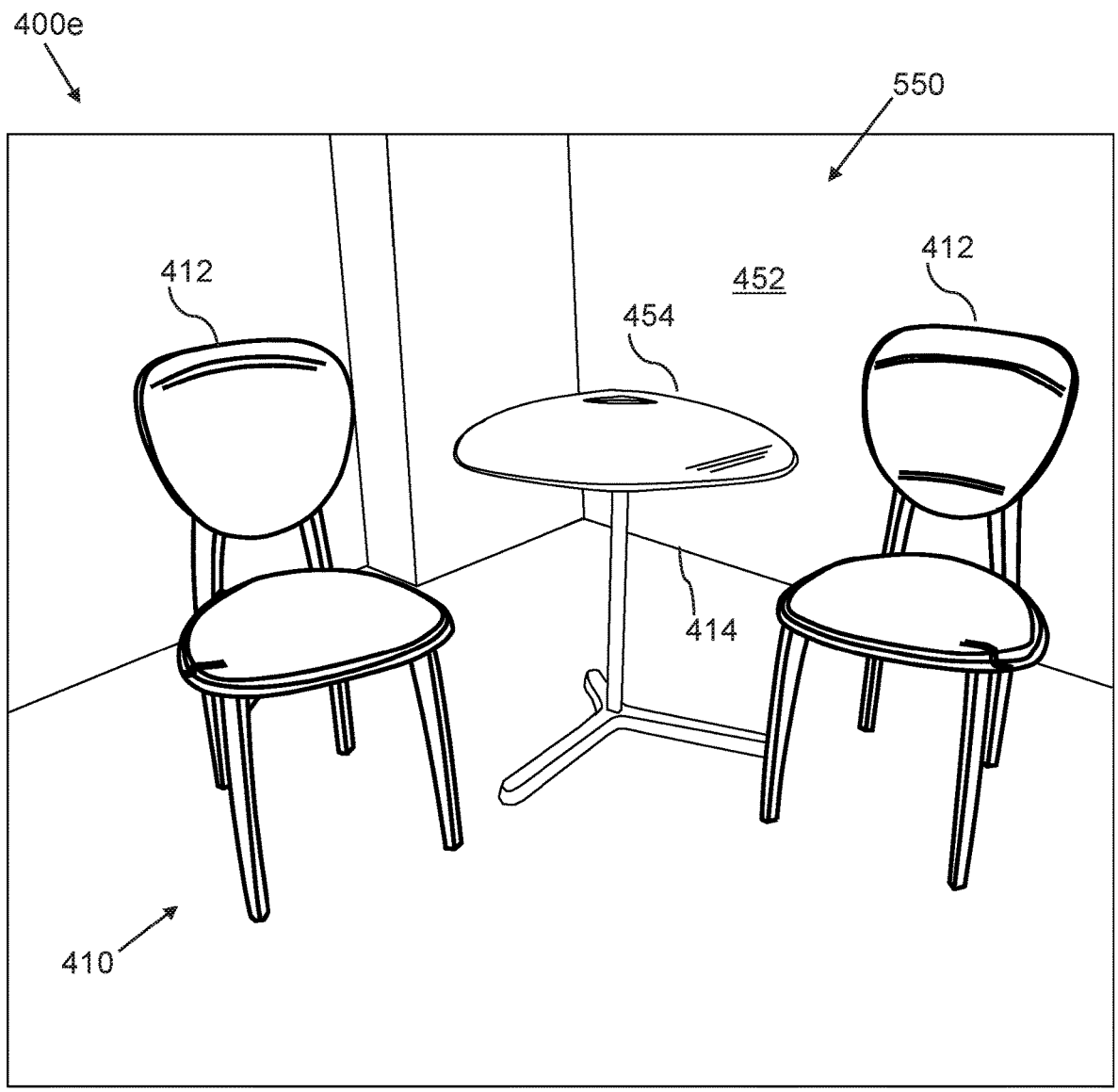
FIG. 4E is an illustration of a graphical user interface for an augmented reality model view, according to an embodiment of the invention.

In related embodiments, a user can interact with the augmented reality layout device 104 via views of the model, such that the model viewer 310 is configured to provide the views, including:
a) an augmented reality (AR) view 400e, as shown in FIG. 4E, which is a real-time camera view (AR view) with a three-dimensional perspective view of an environment with the design model superimposed thereon. FIG. 4E shows a rendering of a design model 410 with 2 chairs 412 and a boundary 414 superimposed on an environment 550 that includes walls 452 and a table 454;
b) a three-dimensional perspective (3D) view 400d of the model (room+layout), as shown in FIG. 4D; and
c) a two-dimensional top (2D) view 400c of the model (room+layout), as shown in FIG. 4C;

The AR view 400e is available when the app is in online mode (camera is on). The 3D/2D views are always available, whether the app is in online/offline mode In a further related embodiment, the model viewer 310 can be configured to enable the user 122 to switch dynamically between the AR, 3D, and 2D views 400e 400d 400c.

In related embodiments, there can be a 1-to-1 mapping between AR/3D/2D views 400e 400d 400c, so that an object/location identified in one view can be located/identified in another view, such that feature/object location/orientation in one view can be mapped to its location/orientation in other views, such that when the user 122 adds an object (such as a piece of furniture or a machine) into on view and specifies its location/orientation, it is automatically inserted into all other views as well. All 3 views (AR, 3D, 2D) are synchronized at all times. When an object is moved, resized, rotated in one view, the corresponding adjustment is made in other views automatically.

Figure 4F:
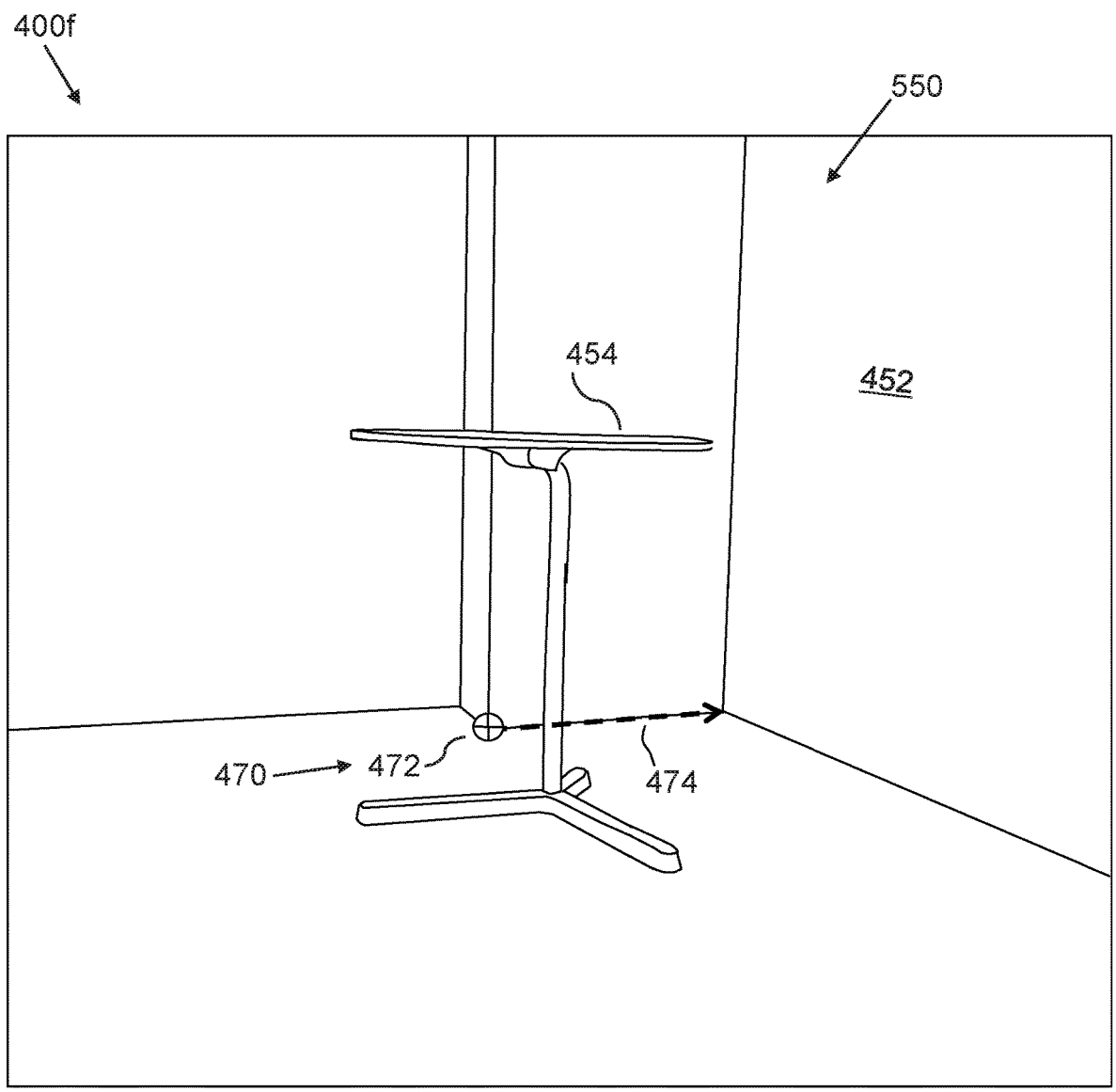
FIG. 4F is an illustration of a graphical user interface for an augmented reality model view, according to an embodiment of the invention.
Figure 4G:
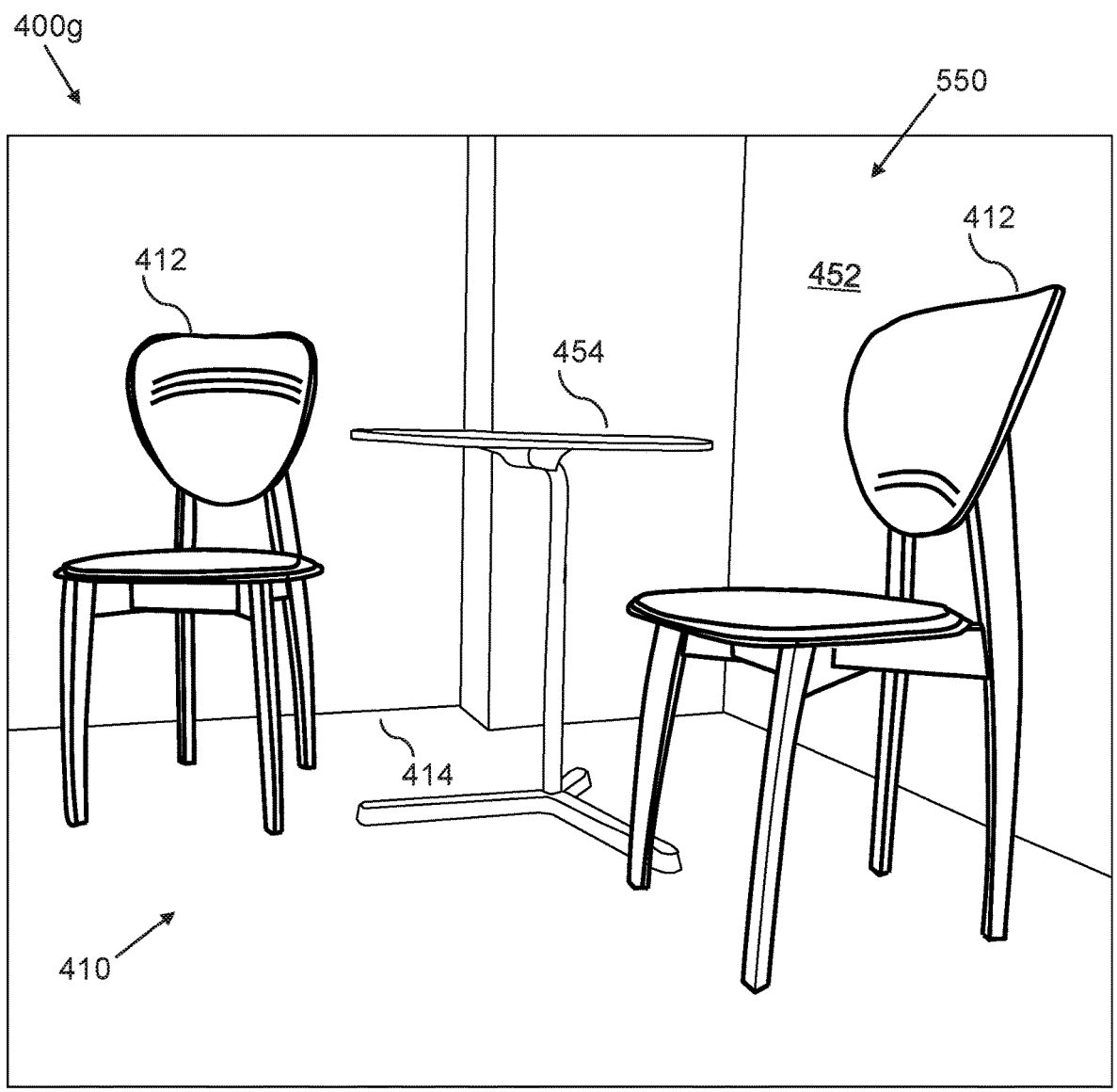
FIG. 4G is an illustration of a graphical user interface for an augmented reality model view, according to an embodiment of the invention.

In another related embodiment, the model synchronizer 314 can be configured to realign the design model when the design model is reloaded by executing a synchronization to overlay a 3D view of a previously created/stored design model with a video stream (as streamed from the camera), to produce an augmented reality view 400e, wherein the previously stored design model includes an original alignment vector 460, including an original location 462 and an original direction vector 464, as shown in FIGS. 4A and 4B, showing original augmented reality view 400a 400b, wherein the synchronization comprises:
a) Identifying a current alignment vector 470, including a current location 472 and a current direction vector 474 in the video stream view 400f 400g, as shown in FIGS. 4F and 4G; and
b) Performing a linear transformation calculation to calculate the transposition vector and transformation matrix, which performs a linear perspective transposition and rotational transformation from the location and direction of the 3D view to the corresponding camera, by using well-known methods of linear algebra for coordinate transformation and perspective calculation;
c) Overlaying the model by transposing and transforming a 3D view of the model, by applying the transposition vector and the transformation matrix to the 3D view, to overlay/synchronize the 3D view with the camera view, to produce an augmented reality view;
whereby the synchronization allows reuse of a previously stored design model, such that the 3D view of the model is transformed to match a current position and viewing direction, corresponding to the current alignment vector.

In a further related embodiment, the augmented reality layout device can further include:
a model synchronizer, which is configured to align the design model with the video stream, such that the model synchronizer allows the user to capture an initial alignment vector that overlays an initial alignment position in the video stream during initial positioning of objects in the augmented reality view, such that the design model is stored with the initial alignment vector.

In a yet further related embodiment, the model synchronizer can be further configured to realign the design model when the design model is reloaded from storage (i.e. from the model cache 316 or the model storage 212);
such that the model synchronizer allows the user to capture a current alignment vector that overlays a current alignment position in the video stream;
such that the model synchronizer executes a linear transformation calculation to calculate a transposition vector and a transformation matrix, such that the model synchronizer executes a linear perspective transposition and rotational transformation from the location and direction of an initial three-dimensional view to a current three-dimensional view of the design model, such that the current three-dimensional view is superimposed on the video stream.

In related embodiments, while the user can manipulate objects in the AR view 400e, it is primarily meant to provide a dynamic/interactive/realistic visualization of the room with user-defined objects layout superimposed. The primary purpose of the 2D view is to allow a simple interactive tool for easy and precise creation of object layout.

In a related embodiment, the AR view 400e, as provided by the model viewer 310, include the following features/functions:
a) is rendered in real time;
b) by moving the augmented reality layout device 104, the user 122 can see a real-time augmented reality view of the room from any angle/direction; and
c) while the user 122 can manipulate objects in AR view 400e, it is primarily meant to provide a dynamic/interactive/realistic visualization of the room with user-defined objects present (superimposed).

In a related embodiment, the 3D view, as provided by the model viewer 310, include the following features/functions:

a) A user 122 can add/delete/move/manipulate layout objects in the 3D view;
b) The 3D view allows the user 122 to measure lengths/distances; and
c) The 3D view is meant to provide a schematic visualization of the room and object layout.

In a related embodiment, the 2D view, as provided by the model viewer 310, include the following features/functions:
a) The 2D view is a top-view projection of the 3D view onto the floor
b) The User 122 can perform the same operations as in 3D view
c) The primary purpose of 2D view is to allow a simple interactive tool for easy and precise creation of object layout In related embodiment, the augmented reality layout device 104 can load, process, and save objects in an object cache 318, and can save and retrieve objects from an object library 214 in the augmented reality layout server 102, such that:
a) The user 122 can add/delete objects in the object library 214;
b) Objects can be obtained from various sources, e.g. internet, local computer, etc., and can be imported in various data formats, including well known CAD file formats, such as DWG; and
c) Objects can have various attributes, such as color, texture, etc. that are rendered with the object.

In related embodiment, the augmented reality layout device 104 can store the design model in a serialized format, such as XML, JSON, YAML, or other formats, for example for storage in the model storage 212 and/or model cache 316.

Figure 5:
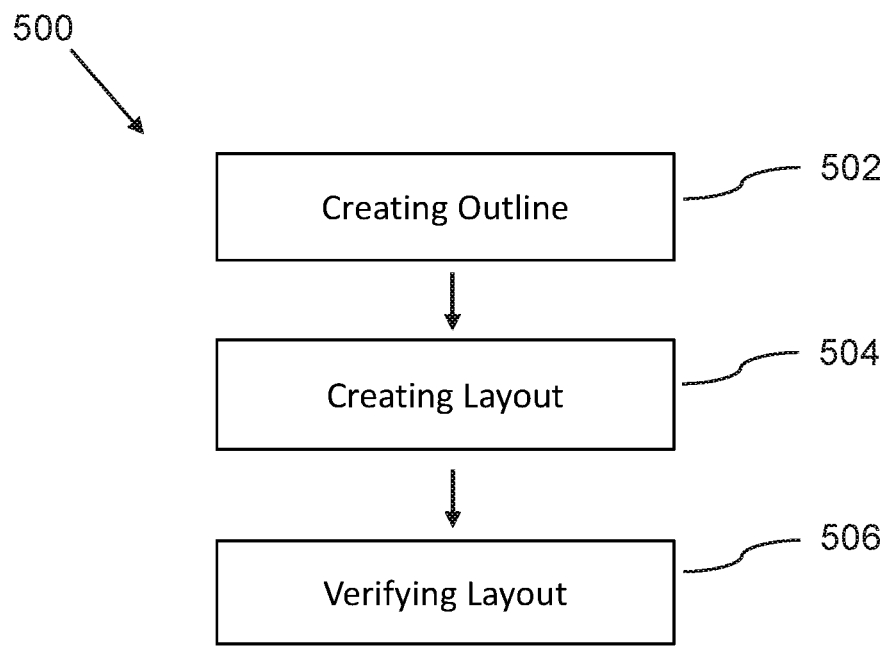
FIG. 5 is a flowchart illustrating steps that may be followed, in accordance with one embodiment of a method or process of augmented reality layout.

In an embodiment, as illustrated in FIG. 5, a method for augmented reality layout 500, can include:
a) Creating a design model with an outline 502 of a room/environment using a 3D AR view of the room/environment, including:
  i. Detecting floor surface in the 3D augmented reality view;
  ii. Identifying the boundary of the room in the 3D augmented reality view;
  iii. Identifying an alignment vector in the 3D augmented reality view
  iv. Generating a top-view (floorplan) of the room from the boundary;
  v. synchronizing 3D and top views of the room;
b) Create a precise layout 504 of objects (e.g. machines, furniture, etc.) using the top-view, including:
  i. creating a layout by placing/arranging objects in the 2D top-view in the objects precise locations, such that the boundary of the room and size/location of objects are shown correctly, with their correct relative dimensions/locations;
  Note that the real-time 3D view is not suitable for the creation of a precise layout
c) Verify the layout 506 by visualizing the layout in 3D (AR) view, including:
  i. To verify the layout, the user will switch to 3D (AR) view, such that the layout is superimposed on a real-time view of the room;
  ii. Optionally, the user 122 can then modify the layout in either AR, 3D or 2D top view In related embodiment, as illustrated in FIG. 6, a method for augmented reality layout 600 can include:
creating a design model 602 with an outline of an environment using an augmented reality view showing a video stream with a real-time view of the environment, including:
  identifying a boundary of the environment in the augmented reality view.

In a further related embodiment, the method for augmented reality layout 600 can further include:
  identifying an initial alignment vector 604 in the augmented reality view that overlays an initial alignment position in the video stream; and storing the design model with the initial alignment vector.

In another further related embodiment, the method for augmented reality layout 600 can further include:
  creating a layout 606 with at least one object in the design model using a two-dimensional top view of the design model, including positioning the at least one object precisely in the two-dimensional top view, such that size and location of the at least one object within the boundary of the environment are shown with correct relative dimensions.

In a yet further related embodiment, the method for augmented reality layout 600 can further include:
  verifying the design model 608 by visualizing the layout in the augmented reality view, such that the layout is superimposed on the real-time view of the environment.

In a yet further related embodiment, the method for augmented reality layout 600 can further include:
  editing the design model 610 in the augmented reality view.

In a yet further related embodiment, the method for augmented reality layout 600 can further include:
  realigning the design model 612 when the design model is reloaded, comprising
    capturing a current alignment vector that overlays a current alignment position in the video stream, and executing a linear transformation calculation to calculate a transposition vector and a transformation matrix, and then executing a linear perspective transposition with the transposition vector and executing a rotational transformation with the transformation matrix from a location and direction of an initial three-dimensional view to a current three-dimensional view of the design model, such that the current three-dimensional view is superimposed on the video stream.

In a related embodiment, a two-dimensional floorplan/layout can be prepared and saved, such that the two-dimensional layout can be loaded at a later time, such that a user viewing the room can sync the two-dimensional layout with the three-dimensional augmented reality view.

In related embodiments, the augmented reality layout device 104 can include configurations as:
a) A mobile app, executing on a mobile device, such as for example an ANDROID™ phone or IPHONE™, or any wearable mobile device;
b) A tablet app, executing on a tablet device, such as for example an ANDROID™ or IOS™ tablet device;
c) A web application, executing in a Web browser;
d) A desktop application, executing on a personal computer, or similar device;
e) An embedded application, executing on a processing device, such as for example a smart TV, a game console or other system.

It shall be understood that an executing instance of an embodiment of the system for augmented reality layout 100, as shown in FIG. 1, can include a plurality of augmented reality layout devices 104, which are each tied to one or more users 122.

An executing instance of an embodiment of the system for augmented reality layout 100, as shown in FIG. 1, can similarly include a plurality of augmented reality layout servers 102.

FIGS. 1, 2, 3 and 5 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

Figure 2:
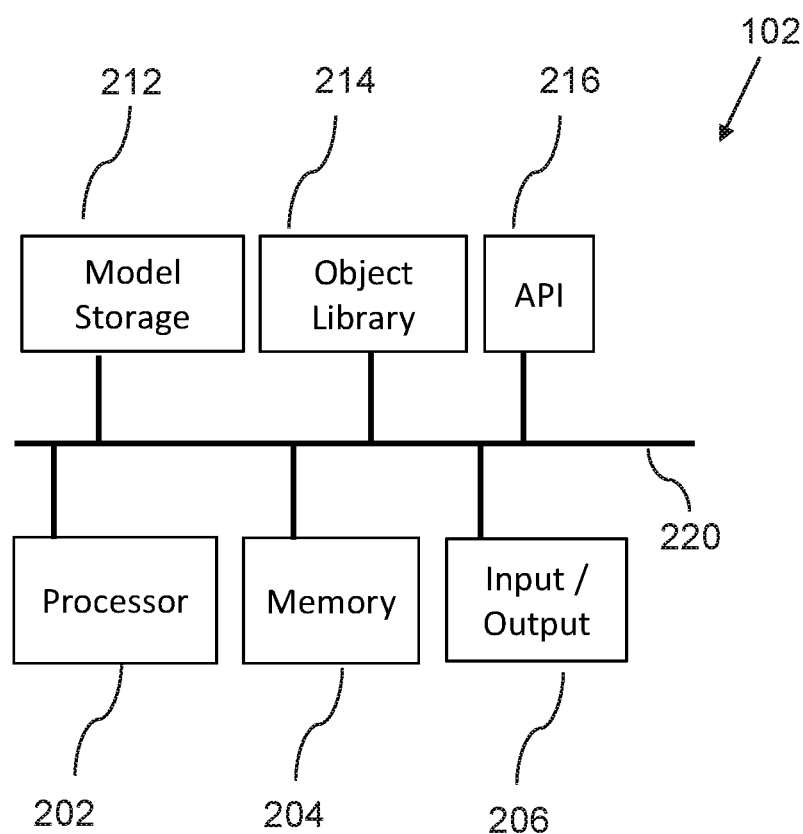
FIG. 2 is a schematic diagram illustrating an augmented reality layout server, according to an embodiment of the invention.
Figure 3:
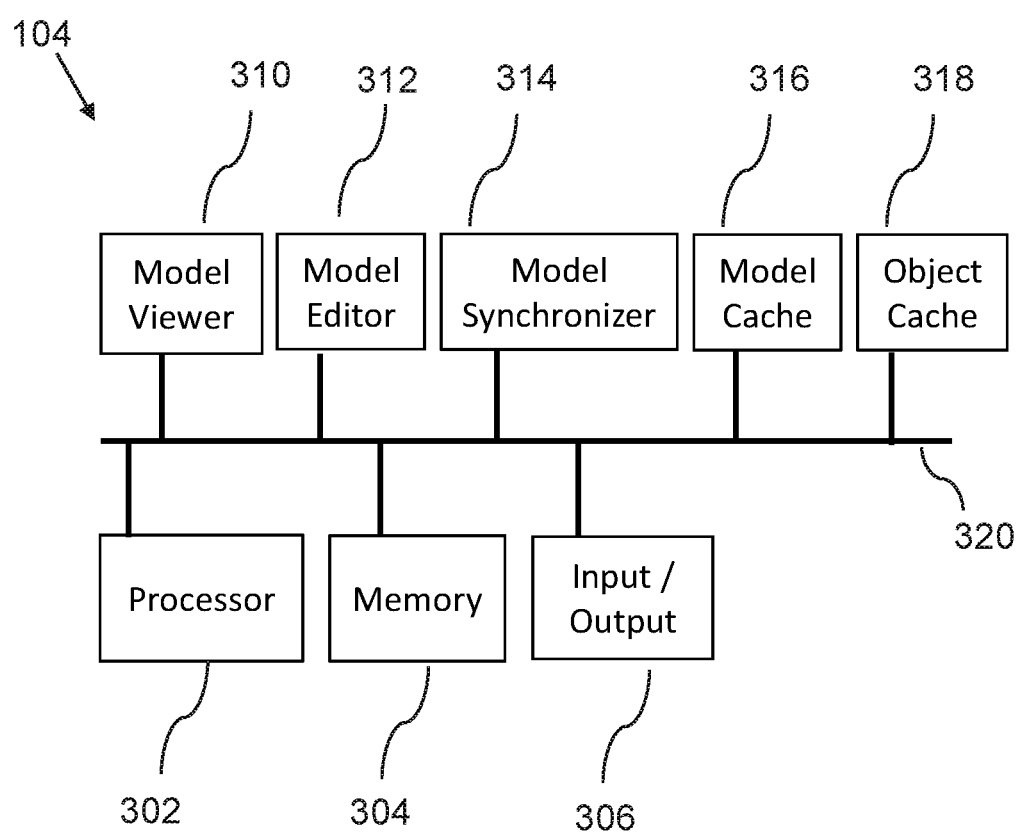
FIG. 3 is a schematic diagram illustrating an augmented reality layout device, according to an embodiment of the invention.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system for augmented reality layout 100, including the augmented reality layout server 102, and the augmented reality layout device 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as AMAZON EC2™ or MICROSOFT AZURE™.

It shall be understood that the above-mentioned components of the augmented reality layout server 102 and the augmented reality layout device 104 are to be interpreted in the most general manner.

For example, the processors 202 302 can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the augmented reality layout server 102 and the augmented reality layout device 104 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the augmented reality layout device 104 communicates with the augmented reality layout server 102 over a network 106, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the system for augmented reality layout 100, the augmented reality layout server 102 device, the augmented reality layout device 104, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the augmented reality layout server 102 and the augmented reality layout device 104. The components of the augmented reality layout server 102 can be distributed over a plurality of physical, logical, or virtual servers. Parts or all of the components of the augmented reality layout device 104 can be configured to operate in the augmented reality layout server 102, whereby the augmented reality layout device 104 for example can function as a thin client, performing only graphical user interface presentation and input/output functions. Alternatively, parts or all of the components of the augmented reality layout server 102 can be configured to operate in the augmented reality layout device 104.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A system for augmented reality layout, comprising:
a) an augmented reality layout server; and
b) an augmented reality layout device, which comprises a camera; and
c) a model synchronizer, which is configured to align the design model with the video stream, such that the model synchronizer allows the user to capture an initial alignment vector that overlays an initial alignment position in the video stream during initial positioning of objects in the augmented reality view, such that the design model is stored with the initial alignment vector;
wherein the augmented reality layout device is configured to create a design model and populate the design model with objects retrieved from the augmented reality layout server;
such that the augmented reality layout device is configured to allow a user to position the objects precisely in a two-dimensional top view of the design model; and
such that the augmented reality layout device is configured to show the design model in an augmented reality view, wherein the design model is superimposed on a video stream showing an environment that the design model is designed for,
wherein the video stream is received from the camera of the augmented reality layout device;
wherein the model synchronizer is further configured to realign the design model when the design model is reloaded;
such that the model synchronizer allows the user to capture a current alignment vector that overlays a current alignment position in the video stream,
such that the model synchronizer executes a linear transformation calculation to calculate a transposition vector and a transformation matrix, such that the model synchronizer executes a linear perspective transposition and rotational transformation from a location and direction of an initial three-dimensional view to a current three-dimensional view of the design model, such that the current three-dimensional view is superimposed on the video stream.

2. The system for augmented reality layout of claim 1, wherein the augmented reality layout device further comprises:
a) a processor;
b) a non-transitory memory;
c) an input/output component; and
d) a model viewer, which is configured to render views of the design model, wherein the views include the two-dimensional top view, a three-dimensional perspective view, and the augmented reality view.

3. The system for augmented reality layout of claim 2, wherein the augmented reality layout device further comprises:
a model editor, which is configured to allow the user to create, edit, save, and delete the design model.

4. The system for augmented reality layout of claim 1, wherein the augmented reality layout server further comprises:
a) a processor;
b) a non-transitory memory;
c) an input/output component;
d) a model storage, which stores a plurality of design models; and
e) an object library, which stores a plurality of objects for use in the design model.

5. The system for augmented reality layout of claim 4, wherein the design model is stored in the model storage in a serialized format.

6. A system for augmented reality layout, comprising:
an augmented reality layout device, which comprises a camera, an object cache, and a model synchronizer;
wherein the augmented reality layout device is configured to create a design model and populate the design model with objects retrieved from the object cache;
wherein the model synchronizer is configured to align the design model with a video stream received from the camera, such that the model synchronizer allows a user to capture an initial alignment vector that overlays an initial alignment position in the video stream during initial positioning of objects in an augmented reality view, such that the design model is stored with the initial alignment vector;
such that the augmented reality layout device is configured to show the design model in the augmented reality view, wherein the design model is superimposed on the video stream showing an environment that the design model is designed for, wherein the video stream is received from the camera of the augmented reality layout device;
wherein the model synchronizer is further configured to realign the design model when the design model is reloaded, such that the model synchronizer allows the user to capture a current alignment vector that overlays a current alignment position in the video stream, such that the model synchronizer executes a linear transformation calculation to calculate a transposition vector and a transformation matrix, such that the model synchronizer executes a linear perspective transposition and rotational transformation of the design model from a location and direction of an initial three-dimensional view to a current three-dimensional view of the design model, such that the current three-dimensional view is superimposed on the video stream.

7. The system for augmented reality layout of claim 6, wherein the augmented reality layout device is configured to allow the user to position the objects precisely in a two-dimensional top view of the design model.

8. The system for augmented reality layout of claim 6, wherein the augmented reality layout device further comprises:
 a) a processor;
 b) a non-transitory memory;
 c) an input/output component; and
 d) a model viewer, which is configured to render views of the design model, wherein the views include a two-dimensional top view, a three-dimensional perspective view, and the augmented reality view.

9. The system for augmented reality layout of claim 8, wherein the augmented reality layout device further comprises:
 a model editor, which is configured to allow the user to create, edit, save, and delete the design model.

10. The system for augmented reality layout of claim 6, further comprising an augmented reality layout server, comprising:
 a) a processor;
 b) a non-transitory memory;
 c) an input/output component;
 d) a model storage, which stores a plurality of design models; and
 e) an object library, which stores a plurality of objects for use in the design model.

11. The system for augmented reality layout of claim 10, wherein the design model is stored in the model storage in a serialized format.

12. A method for augmented reality layout, comprising:
 creating a design model with an outline of an environment using an augmented reality view showing a video stream with a real-time view of the environment, comprising:
  identifying a boundary of the environment in the augmented reality view;
 identifying an initial alignment vector in the augmented reality view that overlays an initial alignment position in the video stream; and storing the design model with the initial alignment vector; and
 realigning the design model when the design model is reloaded, comprising capturing a current alignment vector that overlays a current alignment position in the video stream, and executing a linear transformation calculation to calculate a transposition vector and a transformation matrix, and then executing a linear perspective transposition of the design model with the transposition vector and executing a rotational transformation of the design model with the transformation matrix from a location and direction of an initial three-dimensional view to a current three-dimensional view of the design model, such that the current three-dimensional view is superimposed on the video stream.

13. The method for augmented reality layout of claim 12, further comprising:
 creating a layout with at least one object in the design model using a two-dimensional top view of the design model, including positioning the at least one object precisely in the two-dimensional top view, such that size and location of the at least one object within the boundary of the environment are shown with correct relative dimensions.

14. The method for augmented reality layout of claim 13, further comprising:
 verifying the design model by visualizing the layout in the augmented reality view, such that the layout is superimposed on the real-time view of the environment.

15. The method for augmented reality layout of claim 14, wherein verifying the design model further comprises:
 editing the design model in the augmented reality view.

* * * * *